(12) United States Patent
Roemling

(10) Patent No.: US 7,871,202 B2
(45) Date of Patent: Jan. 18, 2011

(54) FOUR-ROW TAPERED ROLLER BEARING

(75) Inventor: Werner Roemling, Witten (DE)

(73) Assignee: Schaeffler KG, Herzogenaurach (DE)

( * ) Notice: Subject to any disclaimer, the term of this patent is extended or adjusted under 35 U.S.C. 154(b) by 560 days.

(21) Appl. No.: 11/914,335

(22) PCT Filed: May 6, 2006

(86) PCT No.: PCT/DE2006/000783

§ 371 (c)(1),
(2), (4) Date: Dec. 13, 2007

(87) PCT Pub. No.: WO2006/119738

PCT Pub. Date: Nov. 16, 2006

(65) Prior Publication Data

US 2008/0193066 A1    Aug. 14, 2008

(30) Foreign Application Priority Data

May 13, 2005  (DE) .................. 10 2005 022 205

(51) Int. Cl.
*F16C 33/58* (2006.01)
(52) U.S. Cl. ..................................... 384/571
(58) Field of Classification Search ............... 384/571, 384/569, 455
See application file for complete search history.

(56) References Cited

U.S. PATENT DOCUMENTS

| | | | |
|---|---|---|---|
| 1,748,972 A | 3/1930 | Buckwalter |
| 1,820,017 A | 8/1931 | Foulks |
| 2,003,339 A | 6/1935 | Buckwalter |
| 2,130,258 A | 9/1938 | Baker et al. |
| 4,235,485 A | 11/1980 | Reiter |
| 4,513,630 A | 4/1985 | Pere et al. |

FOREIGN PATENT DOCUMENTS

| | | |
|---|---|---|
| DE | 18 13 979 | 11/1970 |
| DE | 18 17 864 | 10/1972 |
| DE | 29 50 775 | 7/1980 |
| DE | 41 42 802 A | 7/1993 |

(Continued)

*Primary Examiner*—Thomas R Hannon
(74) *Attorney, Agent, or Firm*—Lucas & Mercanti, LLP

(57) ABSTRACT

The invention relates to a four-row tapered roller bearing for machine mountings, with an inner ring of two-part design axially and on outer ring of single- or multi-part design axially, with an inner and/or an outer tapered-roller row, being supported in each case by an inner ring part. In order, firstly, to confer a large supporting width on the bearing and, secondly, to ensure as optimum as possible and as uniform as possible a loading of the rolling bodies in the form of the tapered rollers, the tapered-roller rows are arranged in an O-arrangement, and the roller axles or the respectively adjacent outer and inner tapered rollers of the two respectively adjacent outer and inner tapered-roller rows are arranged at an inclination in such a manner that those lines of influence of the tapered rollers which characterize the pressure angles intersect in the region of the axis of rotation of the tapered roller bearing. In addition to other advantages, this bearing can be produced more cost-effectively and, with regard to production quality, more reliably than known four-row tapered roller bearings.

9 Claims, 1 Drawing Sheet

FOREIGN PATENT DOCUMENTS

| | | | | | |
|---|---|---|---|---|---|
| DE | 103 31 936 | 2/2005 | GB | 7 24 535 | 2/1955 |
| EP | 0425 072 A | 5/1991 | GB | 23 71 603 | 7/2002 |
| | | | JP | 2003 184885 | 7/2003 |
| | | | JP | 2005 331054 P | 12/2005 |

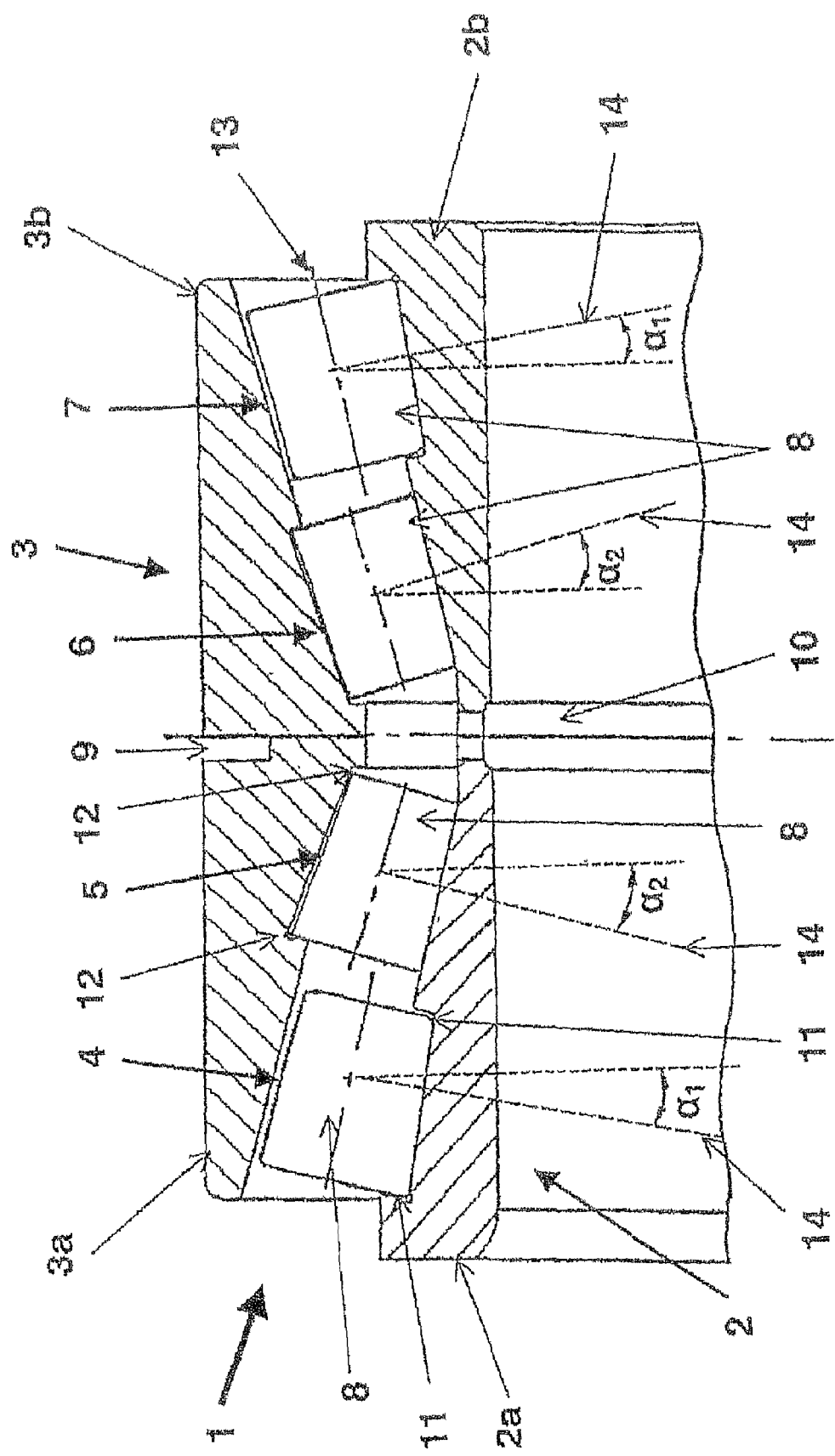

FOUR-ROW TAPERED ROLLER BEARING

FIELD OF THE INVENTION

The invention relates to a four-row tapered roller bearing, for example for machine construction bearings such as planet bearings or rolling mill bearings, having an inner ring which is formed axially in two parts and having an outer ring which is formed axially in one or more parts, with in each case an outer and an inner tapered roller row being supported by one inner ring part.

BACKGROUND OF THE INVENTION

Tapered roller bearings are already long known. For example, U.S. Pat. No. 2,130,258 describes tapered roller bearings of tandem-type, X-type and O-type construction, in which the tapered rollers are supported by substantially identically-designed single-part or multi-part inner rings and substantially identically designed multi-part outer rings. Said document also discloses a four-row tapered roller bearing of X-type or O-type construction in which the in each case axially outer tapered roller row and the adjacent axially inner tapered roller row have tapered rollers which are arranged so as to be of equal size and aligned in the same direction, and in which the pressure angles of said tapered rollers are accordingly in each case identical.

A disadvantage of said tapered roller bearing is that it is composed of a very large number of individual parts, which increases the assembly expenditure and the production costs.

In contrast, DE 41 42 802 A1 discloses a four-row tapered roller bearing which provides the combinations of an O-arrangement with an X-arrangement, by virtue of the tapered rollers being arranged between an axially multi-part inner ring and an axially multi-part outer ring, and the inner roller rows being formed in an O-arrangement and the adjacent outer roller rows being formed in an X-arrangement. Said tapered roller bearing is also disadvantageously composed of a comparatively large number of individual parts.

It is additionally known from practice that bearings with an O-arrangement gives the bearing point a large support width, and these bearings are as a result very rigid and can absorb large tilting moments. In contrast, bearings with an X-arrangement have a small support width and rigidity, and their ability to absorb tilting moments is accordingly lower than in the case of an O-arrangement as well.

It is additionally known that, in the case of four-row tapered roller bearings, one bearing point alone constitutes a statically indeterminate mounting, which itself can lead, as a result of the elasticity of the surrounding components and of the rolling bodies, to a different rolling body loading and, as a result, to a reduced service life of the bearing system. The invention described below addresses this.

OBJECT OF THE INVENTION

The invention is based on the object of creating an improved four-row tapered roller bearing which is optimally suitable for example for machine construction bearings such as planet gear bearings, rolling mill bearings and the like and which, on the one hand, gives the bearing point a large support width and as a result makes the latter very rigid and capable of absorbing large tilting moments, and on the other hand, ensures as optimum or uniform loading of the rolling bodies as possible. In addition, said tapered roller bearing should comprise as few individual parts as possible, so that its production is considerably more cost-effective than in the case of known four-row tapered roller bearings.

SUMMARY OF THE INVENTION

Proceeding from a four-row tapered roller bearing for machine construction bearings, having an inner ring which is formed axially in two parts and having an outer ring which is formed axially in one or more parts, in which in each case an outer and an inner tapered roller row are supported by one inner ring part, the set object is achieved in that the tapered roller rows are arranged in an O-arrangement, in that the roller axes of the in each case adjacent axially outer and inner tapered rollers of the two in each case adjacent axially outer and inner tapered roller rows are arranged so as to be inclined in such a way that the lines of action, which characterize the pressure angles $\alpha_1$, $\alpha_2$, of the tapered rollers intersect in the region of the rotational axis of the tapered roller bearing, and in that a double support, or a statically determinate support, is generated for each inner ring part. Accordingly, in said four-row tapered roller bearing, proceeding from the axial center of the bearing, the tapered rollers of axially directly adjacent axially inner and outer tapered roller rows are aligned at different angles with respect to the rotational axis of the bearing.

A design which is independent of this achieves the set object by means of a four-row tapered roller bearing for machine construction bearings, having an inner ring which is formed axially in two parts and having an outer ring which is formed axially in one or more parts, with in each case an axially outer and/or an axially inner tapered roller row being supported by one inner ring part, with the tapered roller rows being arranged in an O-arrangement, and the roller axes of the in each case adjacent outer and inner tapered rollers of the two in each case adjacent outer and inner tapered roller rows being arranged so as to be inclined in such a way that the lines of action, which characterize the pressure angles $\alpha_1$, $\alpha_2$, of the tapered rollers do not intersect in the region of the rotational axis of the tapered roller bearing, and a double support, or a statically determinate support, is generated for each inner ring part.

In this design, proceeding from the axial center of the bearing, the tapered rollers of axially directly adjacent axially inner and outer tapered roller rows are aligned at the same angle with respect to the rotational axis of the bearing. The lines of action of the axially in each case directly adjacent inner and outer tapered rollers are therefore also aligned substantially parallel to one another.

The described constructions serve to create a comparatively rigid bearing which has comparatively few individual parts and is particularly suitable for dynamic load cases and prevents non-uniform support of the tapered roller rows with the associated increased noise loading and reduction in the service life or running duration of the bearing. In addition, said measure also serves to prevent for example a disadvantageous wobbling of for example planet gears in unloaded operation, since the bearing by means of said double support for each inner ring part is always statically determinate. As a result of the fact that the bearing is optimized for the dynamic load case, in the case of a static loading of the bearing, safety is also improved and the contact pressure is reduced, and any edge pressing is avoided. In addition, said tapered roller bearing can be produced more cost-effectively and more easily with a constant level of quality as was possible with previously known generic tapered roller bearings.

The subcclaims describe preferred refinements or embodiments of the invention.

According to said subclaims, it is provided that support rims for the axial support of the tapered rollers can be arranged both on the inner and on the outer ring depending on the application. It is additionally proposed that the spacings of the support rims and accordingly the axial length of the tapered rollers are designed as a function of certain boundary conditions, such as any deformation of the surrounding components, for equal loadings of the tapered roller rows. In this respect, with regard to the two inner ring parts, the spacings of the support rims and accordingly the axial lengths of the tapered rollers can be selected to be different.

It can additionally be provided that the number of tapered rollers at least in two of the tapered roller rows deviates from the selected number of tapered rollers in the other tapered roller rows.

It has also proven to be expedient for the tapered rollers of the two inner tapered roller rows to be acted on with a preload or with a different axial play, preferably a smaller axial play, than the other tapered roller rows. This permits a more homogeneous load distribution and a further noise reduction in unloaded or low-load operation.

In addition, to reduce the production costs, it can be expedient for the single-part or multi-part outer ring to be formed by a planet gear or some other gear which has raceways for the tapered rollers.

Finally, with regard to the point of intersection of the lines of action of the tapered rollers, it is preferable for said point of intersection to be at a distance of less than 10% of the bearing's outer diameter from the rotational axis of the tapered roller bearing.

It can be seen overall that the design of a four-row tapered roller bearing according to the invention requires comparatively few individual parts, as a result of which the number of fitting surfaces and measuring surfaces on a bearing of said type is considerably reduced. It is therefore understandable that a bearing of said type can be produced particularly cost-effectively and nevertheless with high quality.

BRIEF DESCRIPTION OF THE DRAWINGS

The invention is explained in more detail below on the basis of the appended drawing of some exemplary embodiments. The single FIGURE shows a four-row tapered roller bearing designed according to the invention in a schematic sectioned illustration.

DETAILED DESCRIPTION OF THE DRAWINGS

The tapered roller bearing 1 illustrated in the drawing is suitable for machine construction bearings, in particular for planet bearings, rolling mill bearings etc. Said tapered roller bearing 1 is composed of a split inner ring 2 with two inner ring parts 2a, 2b, and an outer ring 3 with two outer ring parts 3a, 3b, and four tapered roller rows 4, 5, 6, 7 which are arranged between the inner ring and outer ring parts 2a, 2b, 3a, 3b, with each tapered roller row 4, 5, 6, 7 having a plurality of tapered rollers 8 which themselves are held by at least one cage which is known per se and is accordingly not shown in any more detail.

The two outer ring parts 3a, 3b, in the assembled state, form an annular groove 9 which is situated radially at the outside and which itself merges into at least one radial bore (not shown in any more detail). In addition, a lubricating groove 10 is provided in the connecting region of the two inner ring parts 2a, 2b.

In the present case, two tapered roller rows 5, 6 and 7, 8 are supported by in each case one inner ring part 2a and 2b respectively. As can also be seen from the single FIGURE, the tapered roller rows 4, 5, 6, 7 are arranged in an O-arrangement, which gives the bearing point a large support width and thereby makes said bearing point very rigid and capable of absorbing large tilting moments.

In addition, the outer tapered roller rows 4 and 7 are supported axially between support rims 11 of the inner ring parts 2a, 2b and the inner tapered roller rows 5, 6 are supported axially between support rims 12 of the two outer ring parts 3a, 3b.

It is of course also possible to provide support rims 11, 12 only on the inner ring parts 2a, 2b or on the outer ring parts 3a, 3b, which is also encompassed by the invention (not shown in any more detail). The guidance of the tapered rollers 8, at least of the axially inner tapered rollers 8, in annular rims 12 which are situated radially at the outside is however preferred, since a more favorable lubricant supply is provided in this way.

It is likewise possible, and also encompassed by the invention, to provide an outer ring 3 which is formed in one piece or to assign each tapered roller row 4, 5, 6, 7 a separate outer ring part (not illustrated in any more detail).

In order to be able to ensure as optimum or uniform a loading of the tapered rollers 8 as possible, the roller axes 13 of the tapered rollers 8 of the in each case adjacent outer and inner tapered roller rows 4, 5 and 7, 6 are arranged so as to be inclined in such a way that the lines of action 14, which characterize the pressure angles $\alpha_1$, $\alpha_2$, of the adjacent tapered rollers 8 intersect in the region of the rotational axis (not shown in any more detail here) of the tapered roller bearing 1.

This advantageously results, in a way which is easily comprehensible to a person skilled in the art with knowledge of the invention, in double support, or a statically determinate support, for each inner ring part 2a, 2b.

In this context, it is pointed out that, for optimum effectiveness of the design of a bearing according to the invention, the point of intersection of the lines of action 14 of the tapered rollers 8 is preferably at a distance of less than 10% of the bearing outer diameter from the rotational axis of the tapered roller bearing 1.

Specifically when using the tapered roller bearing designed according to the invention for the mounting of planet gears, in comparison to conventionally-designed tapered roller bearings, for the same loading, a disadvantageous deflection and inclination of the planet journal is now avoided, or at least reduced.

In addition, further possibilities were found for being able to influence the bearing properties of the above-described four-row tapered roller bearing 1.

For example, the spacings of the support rims 11, 12 and accordingly the axial length of the tapered rollers 8 can be designed or varied as a function of certain boundary conditions, such as any deformation of the surrounding components, in order to obtain as equal a loading as possible of the respective tapered roller rows 4, 5, 6, 7, which has an advantageous effect on the bearing service life. As a result, it is therefore possible, with regard to the two inner ring parts 2a, 2b, to select the spacings of the support rims 11, 12 and accordingly the axial length of the tapered rollers 8 to be different.

It is likewise also possible for the number of tapered rollers 8 of at least one, preferably of two of the tapered roller rows 4, 5, 6, 7 to deviate from the selected number of tapered rollers 8 of the other tapered roller rows, in order, for example, to reduce a disadvantageous co-rotation of a single common outer ring 3 in planet gears (not illustrated in any more detail).

It has also proven to be expedient for the two axially inner tapered roller rows 5, 6 to be acted on with a slight preload, as a result of which a homogeneous load distribution and a noise reduction are provided in the low-load range or unloaded range in particular in the case of use in a planetary gear set.

In order to further reduce the number of components and the production expenditure and to increase the accuracy in the production of the tapered roller bearing, it can finally also be expedient for the single-part or multi-part outer ring 3 to be formed by means of, for example, a planet gear or some other gear which has raceways for the tapered rollers 8 (not illustrated in any more detail). The conventional separate outer ring 3 can therefore be dispensed with, and is, so to speak, replaced by the planet gear or other gear.

LIST OF REFERENCE SYMBOLS

1 Tapered roller bearing
2 Inner ring
2*a* Inner ring part
2*b* Inner ring part
3 Outer ring
3*a* Outer ring part
3*b* Outer ring part
4 Tapered roller row
5 Tapered roller row
6 Tapered roller row
7 Tapered roller row
8 Tapered rollers
9 Annular groove
10 Lubricant groove
11 Annular rim
12 Annular rim
13 Roller axis
14 Lines of action
$\alpha_1$ Pressure angle
$\alpha_2$ Pressure angle

The invention claimed is:

1. A four-row tapered roller bearing for machine construction bearings, comprising:
   an inner ring which is formed axially in two parts;
   an outer ring which is formed axially in one or more parts; and
   an axially outer and an axially inner tapered roller row being supported by each inner ring part,
   wherein the tapered roller rows are arranged in an O-arrangement, the roller axes each adjacent outer and inner tapered rollers of the two adjacent outer and inner tapered roller rows are inclined in such a way that the lines of action, which characterize the pressure angles, of the tapered rollers intersect in the region of the rotational axis of the tapered roller hearing, and a double support, or a statically determinate support, is generated for each inner ring part.

2. The four-row tapered roller bearing as claimed in claim 1, wherein support rims for the axial support of the tapered rollers are arranged on the inner and/or on the outer ring.

3. The four-row tapered roller bearing as claimed in claim 2, wherein the spacings of the support rims and the axial length of the tapered rollers are a function of boundary conditions for equal loadings of the tapered roller rows.

4. The four-row tapered roller bearing as claimed in claim 3, wherein the boundary conditions are any deformation of surrounding components.

5. The four-row tapered roller bearing as claimed in claim 3, wherein, with regard to the two inner ring parts, the spacings of the support rims and accordingly the axial lengths and diameters of the tapered rollers are selected to be different.

6. The four-row tapered roller bearing as claimed in claim 1, wherein the number of tapered rollers of at least one of the tapered roller rows deviates from the selected number of tapered rollers of the other tapered roller rows.

7. The four-row tapered roller bearing as claimed in claim 1, wherein the two axially inner tapered roller rows are acted on with a preload or with a different axial play than the other tapered roller rows.

8. The four-row tapered roller bearing as claimed in claim 1, wherein the single-part or multi-part outer ring is formed by a planet gear or some other gear which has raceways for the tapered rollers.

9. The four-row tapered roller bearing as claimed in claim 1, wherein the point of intersection of the lines of action of the tapered rollers is at a distance of less than 10% of the bearing's outer diameter from the rotational axis of the tapered roller hearing.

* * * * *